(12) United States Patent
Grothen et al.

(10) Patent No.: US 10,579,574 B2
(45) Date of Patent: Mar. 3, 2020

(54) INSTRUMENTATION CHASSIS WITH HIGH SPEED BRIDGE BOARD

(71) Applicant: KEYSIGHT TECHNOLOGIES, INC., Santa Rosa, CA (US)

(72) Inventors: Victor M. Grothen, Winsor, CA (US); James David Lusk, Forestville, CA (US); Wayne Lee Johnson, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1106 days.

(21) Appl. No.: 14/502,643

(22) Filed: Sep. 30, 2014

(65) Prior Publication Data

US 2016/0092390 A1  Mar. 31, 2016

(51) Int. Cl.
  *G06F 13/40* (2006.01)
  *G06F 9/445* (2018.01)

(52) U.S. Cl.
  CPC .............................. *G06F 13/4081* (2013.01)

(58) Field of Classification Search
  None
  See application file for complete search history.

(56) References Cited

U.S. PATENT DOCUMENTS

| | | | |
|---|---|---|---|
| 5,761,033 A * | 6/1998 | Wilhelm | H05K 7/1429 361/679.33 |
| 5,875,314 A | 2/1999 | Edholm | |
| 6,981,086 B2 | 12/2005 | Wetzel et al. | |
| 6,981,889 B1 | 1/2006 | Grothen et al. | |
| 7,149,093 B2 | 12/2006 | Conway | |
| 7,362,089 B2 | 4/2008 | Kushnick et al. | |
| 7,363,417 B1 | 4/2008 | Ngai | |
| 8,138,778 B1 | 3/2012 | Smith | |
| 8,626,980 B2 | 1/2014 | Foster | |
| 8,756,360 B1 * | 6/2014 | Richard | G06F 13/4022 710/316 |
| 2003/0179532 A1 * | 9/2003 | Goergen | H05K 1/024 361/118 |
| 2004/0131058 A1 * | 7/2004 | Ghiasi | H03L 7/0807 370/389 |

FOREIGN PATENT DOCUMENTS

| | | |
|---|---|---|
| TW | 592016 B | 6/2004 |
| WO | 03067944 A1 | 8/2003 |

OTHER PUBLICATIONS

Chinese Office Action dated Jul. 1, 2019 with English translation, 19 pgs.

* cited by examiner

*Primary Examiner* — Idriss N Alrobaye
*Assistant Examiner* — Dayton Lewis-Taylor (57) ABSTRACT

An instrumentation chassis includes a backplane, multiple peripheral slots located on the backplane and configured to receive insertable peripheral modules, respectively, and at least one protocol agnostic high speed connection mounted on, but not electrically connected to the backplane. The high speed connection is configured to interconnect at least two peripheral modules in corresponding peripheral slots of the multiple peripheral slots, bypassing the backplane.

19 Claims, 8 Drawing Sheets

INSTRUMENTATION CHASSIS WITH HIGH SPEED BRIDGE BOARD

BACKGROUND

Peripheral component interconnect (PCI) and the more recent peripheral component interconnect express (PCIe) are standards for incorporating peripheral devices into computing systems. PCI and PCIe define physical and logical interfaces and protocols for communication with PCI and PCIe compatible devices. For example, PCIe may be used in consumer and industrial applications as a motherboard level interconnect, a passive backplane interconnect, and an expansion card interface. Various standards are based on PCI and PCIe, such as PCI eXtensions for instrumentation (PXI) and PCIe eXtensions for instrumentation (PXIe), which adapt PCI and PCIe, respectively, for test and measurement applications. The discussion below focuses on PCIe and PXIe, which provide more capability and flexibility, although PCI and PXI are still in use and may be combined with PCIe/PXIe systems to support legacy applications.

PCIe compatible devices may be configured as peripheral modules and interconnected with one another and/or with a system controller through a network of PCIe switches (switch fabric) in a modular instrumentation framework (chassis). For example, the system controller may be connected to a root complex having PCIe ports, each of which is connected to a peripheral device or a PCIe switch. Each PCIe switch is connected to multiple PCIe slots in the chassis, which are configured to receive the peripheral modules. The instrumentation chassis may also include other types of modules, such as a system module for controlling operations of the other modules, and a timing module for providing timing signals to the other modules. The flexible nature of the switch fabric enables customization of an individual system.

Currently, high-speed digital and radio frequency (RF) signal test applications require higher processing capabilities to catch up with increasing bandwidth requirements of modern high bandwidth communications. In conventional modular instrumentation frameworks, such as PXIe compatible frameworks, more signal processing and data handling responsibilities in a measurement flow are being moved from traditional personal computer (PC)-based processing to hardware-based processing and acceleration, in which dedicated hardware is included in a measurement system for data processing. For example, high performance Graphics Processing Units (GPUs) may be used in PC graphics cards for measurement acceleration.

There are conventional solutions for high-speed interconnects among modules (e.g., particularly peripheral modules) in the PXIe protocol for attempting to accommodate the higher speed, including front panel interconnects, standard backplane PCIe connections, and carrier-to-mezzanine connections, although each of these conventional solutions has drawbacks. For example, although many different types of interconnects between modules may be used as front panel interconnects, front panel space is extremely limited and is typically reserved for important interconnects requiring user interaction, such as clocks, triggers, and the like, that need to be readily accessible. Standard backplane PCIe connections provide up to eight lanes of PCIe available on the PXIe backplane, which may support up to 8 Gbps per lane (in Gen3). However, the lanes are protocol specific and may not be viable, e.g., when the protocol in use is not PCIe, the lane speed is too low and/or the number of lanes is insufficient. Carrier-to-mezzanine connections, where the carrier is a main board and the mezzanine is a daughter board within the same module. Thus, multiple module-to-module connections with high speed transceivers, for example, cannot be supported, and spacing between modules is fixed by the carrier-to-mezzanine connector, and thus modules with this interconnect must be at fixed locations adjacent to each other. In addition, present carrier-to-mezzanine interconnects often are unable to run at sufficient data rates without modification.

Accordingly, there is a need for easily implemented, high-speed interconnects for enabling high-speed communications among modules and/or external devices in instrumentation chassis. Further, there is a need for the high-speed interconnects to be able to accommodate any type of communication standard (e.g., as opposed to being limited to PCI or PCIe communications).

SUMMARY

In a representative embodiment, an instrumentation chassis includes a backplane, multiple peripheral slots located on the backplane and configured to receive insertable peripheral modules, respectively, and at least one protocol agnostic high speed connection. The at least one protocol agnostic high speed connection is mounted on, but not electrically connected to the backplane and configured to interconnect at least two peripheral modules in corresponding peripheral slots of the multiple peripheral slots, bypassing the backplane.

In another representative embodiment, an instrumentation chassis includes a backplane, multiple peripheral slots located on the backplane and configured to receive multiple insertable peripheral modules, and a bridge board attachable to the backplane. The bridge board includes multiple differential pair high speed connections configured to interconnect insertable peripheral modules of the multiple insertable peripheral modules.

In another representative embodiment, an instrumentation chassis including a backplane, multiple peripheral slots located on the backplane and configured to receive multiple insertable peripheral modules, and a bridge board attachable to the backplane. The bridge board contains multiple mixed signal connections configured to interconnect insertable peripheral modules, by-passing the backplane, of the multiple insertable peripheral modules.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Various representative embodiments generally provide a bridge board that is configured to enable high speed communications between modules (e.g., transceivers within the modules) in an instrumentation chassis, in addition to or other than communications enabled by the backplane of the instrumentation chassis. The bridge board may be physically, but not electrically, attached to the backplane in order to bypass the circuitry (e.g., switching fabric) of the backplane, while providing an interconnect between the modules inserted in the instrumentation chassis. The interconnect may include numerous lanes of differential pair high speed connections, for example. Also, unlike the backplane, the bridge board is "protocol agnostic," meaning that the protocol of the transceivers performing the communication and the protocol (or format) of the data itself does not matter to the bridge board. That is, the interconnect accommodates the electronic communication regardless of the protocol(s) of the receiving and transmitting entities.

Figure 1:
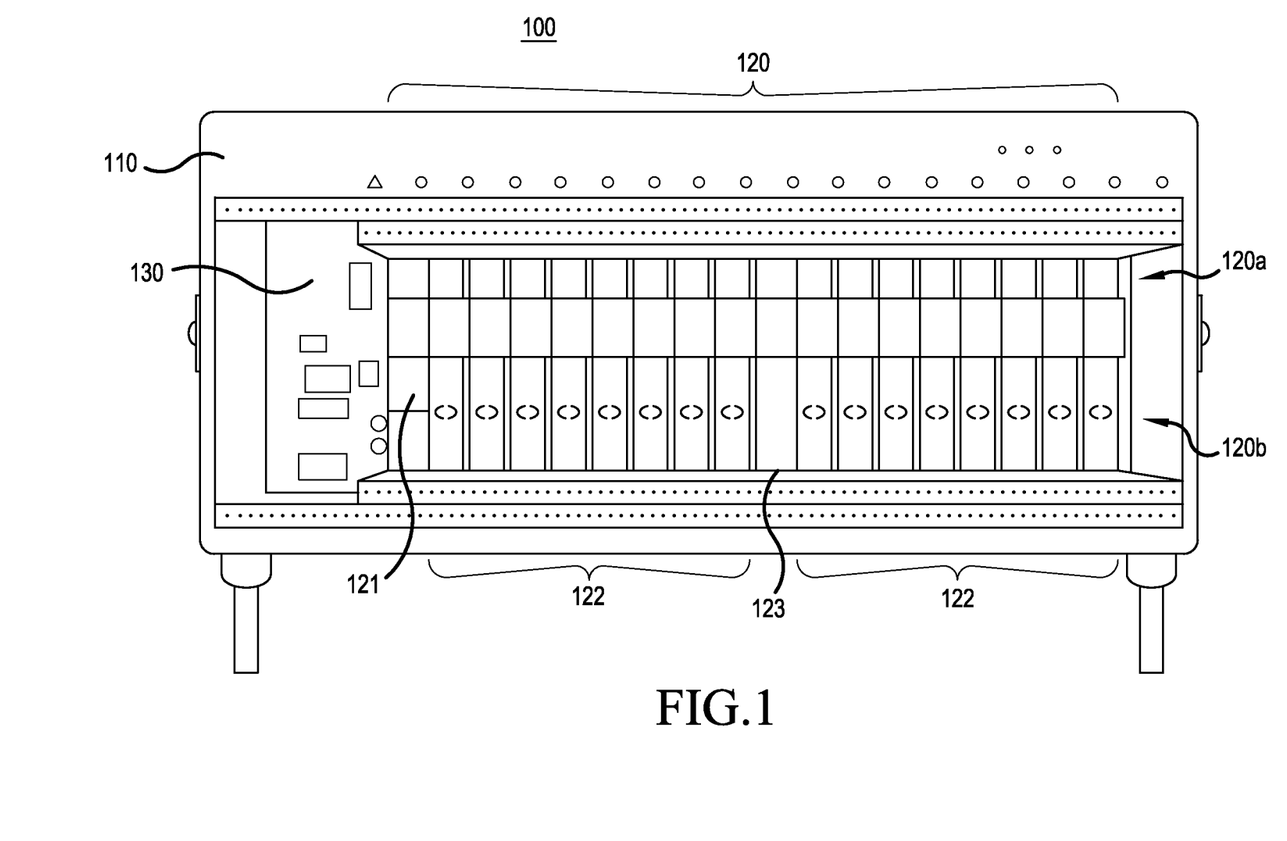
FIG. 1 is a front plan view of an illustrative modular instrumentation chassis, in which a bridge board may be incorporated, according to representative embodiments.

FIG. 1 is a front plan view of an illustrative modular instrumentation chassis, in which a bridge board may be incorporated, according to representative embodiments.

Referring to FIG. 1, instrumentation chassis 100 is shown as an 18-slot, hybrid PXI/PXIe chassis, for example, although various numbers of slots (e.g., 10-slots) and/or various alternative types of chassis (e.g., a PXIe chassis or an Advanced Telecommunications Computing Architecture (ATCA) eXtensions for instrumentation (AXIe) chassis), may be incorporated without departing from the scope of the present teachings. In the depicted example, the instrumentation chassis 100 is empty, in that it contains no plug-in modules, in order to show the internal rear portion of the instrumentation chassis 100, as viewed through the large front opening of front panel 110. The rear portion includes slots 120, into which modules may be removably inserted, and a backplane 130 (a portion of which is visible next to the left-most slot (system slot 121) of the slots 120). The backplane 130 generally provides a switch fabric for selectively interconnecting the modules inserted into corresponding slots 120. In an embodiment, the instrumentation chassis 100 may also include a mezzanine board (not shown), mounted behind the backplane, to accommodate all or a portion of the switching functionality.

Because the illustrative instrumentation chassis 100 is a hybrid PXI/PXIe chassis, the slots 120 include a system slot 121, peripheral slots 122, and a timing slot 123. In the depicted configuration, the peripheral slots 122 are divided into a first set of eight peripheral slots 122 to the left of the timing slot 123 and a second set of eight peripheral slots 122 to the right of the timing slot 123, although other slot arrangements are possible. The system slot 121 is configured to receive a system module, which may include an internal PXIe system controller, or a controller interface for interfacing with an external PXIe system controller, to control operations of the other modules. The peripheral slots 122 are configured to receive any of various types of peripheral modules for providing customized functionality of the instrumentation chassis 100. Examples of peripheral modules include arbitrary waveform generator modules, digital multi-meter (DMM) modules, oscilloscope modules, multiplexer modules, switch modules, accelerator modules, signal generator modules, and the like. The peripheral slots 122 may include PXI slots, PXIe slots or hybrid PXI/PXIe slots (as shown in FIG. 1) for both modules having one or both of PXI and PXIe connectors. The timing slot 123 is configured to receive a timing module for providing timing signals to one or more of the inserted peripheral modules and the system module. Individual slot panels (not shown in FIG. 1) may be attached to the front panel 110 of the instrumentation chassis 100 to cover portions of the front opening corresponding to slots that are not occupied by removable modules.

The connections among inserted modules enabled by the backplane are made in accordance with the PCI and/or PCIe standards, for example. In the example shown in FIG. 1, the top row 120a of the slots 120 are configured for PXIe connections and the bottom row 120b of the slots 120 are configured for PXI connections. Generally, PXIe modules (e.g., plugged into the top row 120a of the peripheral slots 122) require PCIe for communications via the backplane 130, and two different power supplies (+3.3V and +12V), while PXI modules (e.g., plugged into the bottom row 120*b* of the peripheral slots 122 and the top connector of 120*a*) require PCI for communications via the backplane 130, and four different power supplies (+3.3V, +5V, +12V and −12V). Of course, supporting both PXIe and PXI also requires the backplane to support both PCIe and PCI protocols.

Figure 2:
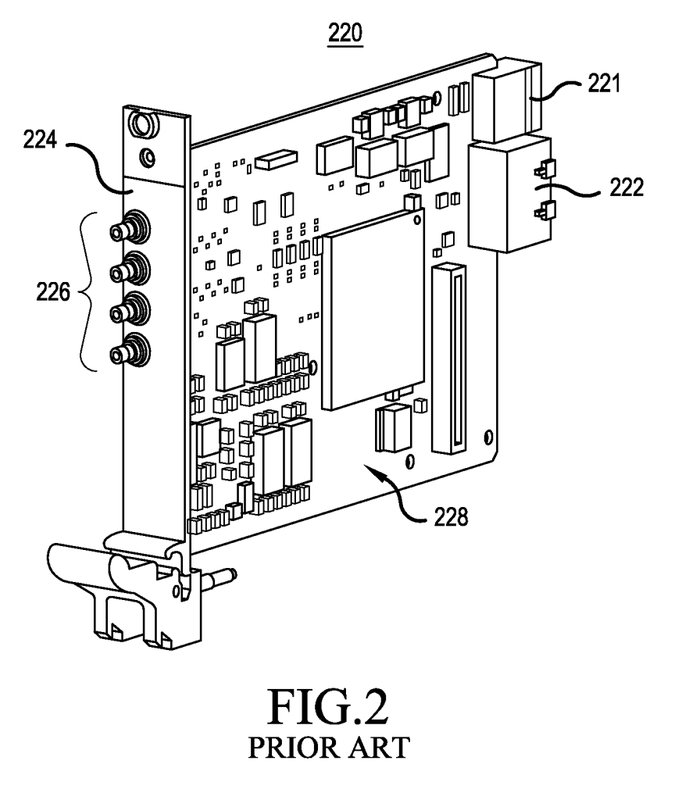
FIG. 2 is side perspective view of a conventional peripheral module configured for insertion within a peripheral slot of an instrumentation chassis.

FIG. 2 depicts a conventional peripheral module 220 configured for insertion within a peripheral slot of an instrumentation module, such as the instrumentation chassis 100. For purposes of illustration, the peripheral module 220 is assumed to be designed in accordance with the PXIe standard. The peripheral module 220 therefore includes two standard PXIe connectors 221 and 222 that extend from an upper region of the rear portion of the peripheral module 220 that plug into one of the peripheral slots 122 (in the top row 120*a*). This enables access to the switch fabric of the backplane 130 (and/or a mezzanine card attached thereto) for communications with other modules, including other peripheral modules, the system module in the system slot 121, and/or the timing module in the timing slot 123, for example. The module 220 also includes a module front panel 224. The module front panel 224 may include various controls (e.g., power switch, rheostat) (not shown) to enable operational control of the circuitry within the module 220, as well as exposed connectors 226 (e.g., coaxial cable connectors) to enable direct connectivity to front panels of other modules within the instrumentation chassis 100 and/or to external devices. If the module 220 were designed in accordance with the PXI standard, it would include standard PXI connector(s) that extend from a lower region of the rear portion of the peripheral module 220 that plug into one of the peripheral slots 122 (in the bottom row 120*b*). Also, alternatively, the peripheral module 220 may have both PXIe and PXI connectors.

The peripheral module 220 includes a printed circuit assembly (PCA) 228 to provide the corresponding functionality. For example, the PCA 228 may include a power supply and regulator and an electronic circuit, including one or more of a clock generator, triggering and synchronization, random access memory (RAM) (e.g., dynamic RAM (DRAM), static RAM (SRAM) and/or synchronous dynamic RAM (SDRAM)), read only memory (ROM) (e.g., erasable programmable ROM (EPROM), electrically erasable programmable ROM (EEPROM), flash memory), and the like. The PCA 228 may further include processing or converter elements, such as a field-programmable gate array (FPGA), an application-specific integrated circuit (ASIC), a JESD204B Analog to Digital Converter and/or a JESD204B Digital to Analog Converter, for example. Under certain circumstances, it may be desired for an FPGA of one PCA 228 to communicate directly with an FPGA and/or an ASIC on another PCA 228, e.g., on a different peripheral module 220. Conventionally, this communication passes through the backplane 130, which is limited by the PCIe and/or PCI protocol. This is particularly problematic for high-speed data transmission and/or PCA transceivers that use alternative communication protocols.

Figure 3:
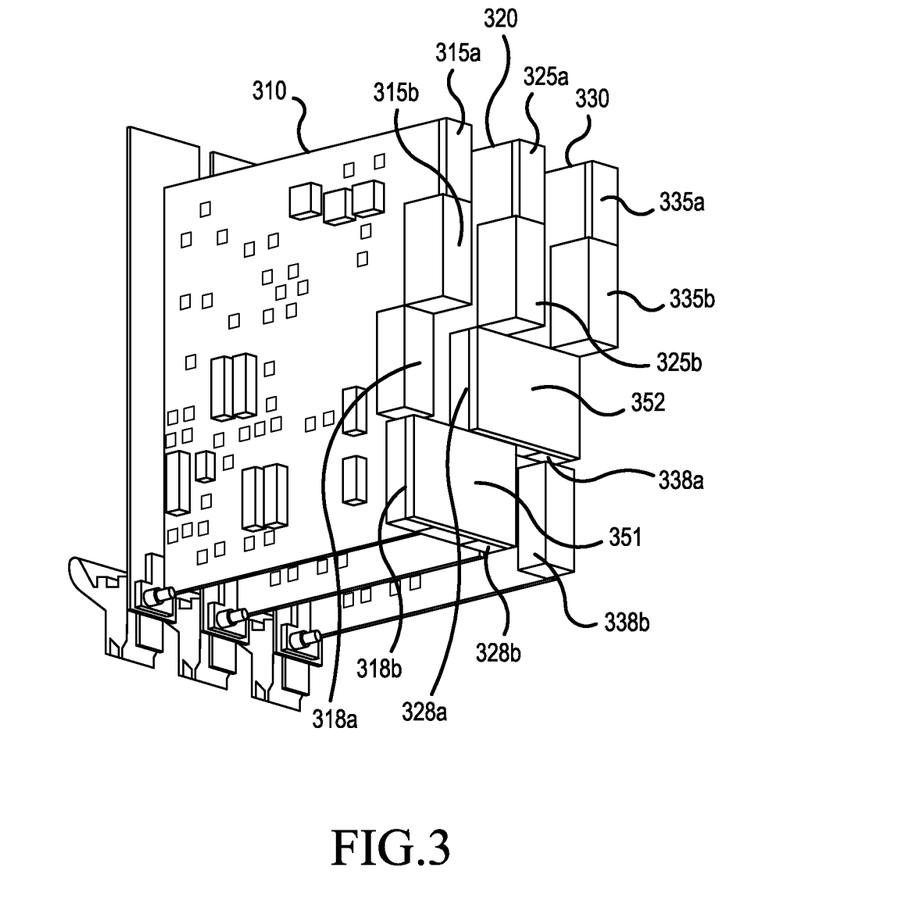
FIG. 3 is a back perspective view of multiple modules interconnected using bridge boards, to enable high speed connections, according to a representative embodiment.

Thus, according to representative embodiments, at least one bridge board (not shown in FIG. 1) is mounted on, but not electrically connected to, the backplane 130 or the connectors of the slots 120, and configured to interconnect at least two peripheral modules and/or PCAs to accommodate the high speed communications, regardless of protocol. The at least one bridge board may be mounted using stand-offs, a bridge board restraint, or other connection mechanism, examples of which are discussed below. Alternatively, the at least one bridge board may be pre-mounted on the at least two peripheral modules to establish the high speed connection (e.g., as shown in FIG. 3), and then the combined at least two peripheral modules may be inserted as an integrated unit into (adjacent) peripheral slots 122. The at least two modules and/or PCAs may include, for example, two peripheral modules plugged into corresponding peripheral slots 122, or one peripheral module plugged into a corresponding peripheral slot 122 and a mezzanine board containing a PCA that occupies the space corresponding to another (adjacent) slot 122, but is not necessarily plugged into the connector of the peripheral slot 122, and therefore not in electrical communication with the backplane 130.

FIG. 3 is a back perspective view of a multiple peripheral modules interconnected using bridge boards, to enable high speed connections, according to a representative embodiment.

Referring to FIG. 3, an example configuration depicts three peripheral modules (first peripheral module 310, second peripheral module 320 and third peripheral module 330) interconnected using two bridge boards (first bridge board 351 and second bridge board 352), where the first and second bridge boards 351 and 352 provide protocol agnostic, high speed connections. That is, the first bridge board 351 is a printed circuit board that provides high speed lanes for transmitting signals between the adjoined first peripheral module 310 and the second peripheral module 320, and the second bridge board 352 is a printed circuit board that provides high speed lanes for transmitting signals between the adjoined second peripheral module 320 and the third peripheral module 330, regardless of the protocol(s) of the respective transmitting and receiving circuits. The number of high speed lanes may be large, as compared to the lanes available for communication via the backplane 130. For example, each of the first and second bridge boards 351 and 352 may include in excess of 24 lanes, although any number of lanes may be incorporated without departing from the scope of the present teachings. Of course, the three peripheral modules and two bridge boards are depicted for purposes of illustration, and it is understood that various numbers of peripheral modules and/or bridge boards connecting two or more of the peripheral modules may be incorporated without departing from the scope of the present teachings.

In the depicted configuration, each of the first, second and third peripheral modules 310, 320 and 330 has two standard PXIe connectors and two high speed connectors. That is, the first peripheral module 310 has first and second PXIe connectors 315*a* and 315*b*, and first and second high speed connectors 318*a* and 318*b*; the second peripheral module 320 has first and second PXIe connectors 325*a* and 325*b*, and first and second high speed connectors 328*a* and 328*b*; and the third peripheral module 330 has first and second PXIe connectors 335*a* and 335*b*, and first and second high speed connectors 338*a* and 338*b*. The first bridge board 351 is connected between the first high speed connectors 318*a* and 328*a* to provide high speed lanes between the first and second peripheral modules 310 and 320. The second bridge board 352 is connected between the second high speed connectors 328*b* and 338*b* to provide high speed lanes between the second and third peripheral modules 320 and 330. Accordingly, the first, second and third peripheral modules 310, 320 and 330 may include processing and/or converter elements that communicate over the high speed lanes contained on the first and second bridge boards 351 and 352, respectively. Of course, the number of peripheral modules and corresponding connections to other peripheral module(s) may vary without departing from the scope of the present teachings. Also, one bridge board (e.g., first or second bridge board 351 or 352) may interconnect more than two peripheral modules.

In various embodiments, each of the first and second bridge boards 351 and 352 provides a differential pair high speed connection. The differential pair high speed connection may be a high speed transceiver connection, including a two-way connection that enables communication in both directions, i.e., between transceivers in the adjoined peripheral modules, or a one-way connection to enable communication in only one direction, i.e., from a transmitter on one peripheral module to a receiver in another connected peripheral module. In an embodiment, the differential pair high speed connection may be a Serializer/Deserializer (SerDes) connection, for example. In alternative embodiments, one or both of the bridge boards 351 and 352 may contain multiple mixed signal connections configured to interconnect first, second and/or third peripheral modules 310, 320 and 330. The mixed signal connections may include radio frequency (RF) or microwave connectors, for example. Also, one or more of the connections may include coaxial blindmate connectors with attached transmission lines between connectors, for example, as described by U.S. Pat. No. 6,981,889, to Grothen et al. (Jan. 3, 2006), which is hereby incorporated by reference in its entirety.

As mentioned above, in various embodiments, the first and second bridge boards 351 and 352 may be attached to the respective high speed connectors prior to insertion of the combined first, second and third peripheral modules 310, 320 and 330 to adjacent peripheral slots 122 in the instrumentation chassis 100. In this way, the first, second and third peripheral modules 310, 320 and 330 attached by the first and second bridge boards 351 and 352 may be inserted collectively as an integrated unit into adjacent peripheral slots 122. Alternatively, the first and second bridge boards 351 and 352 may be attached to portions of the backplane, e.g., via stand-offs or braces, prior to insertion of the first, second and third peripheral modules 310, 320 and 330. In this way, the high speed connections enabled by the bridge boards 351 and 352 are not established until after each of the first, second and third peripheral modules 310, 320 and 330 have been separately inserted into the adjacent peripheral slots 122, coming into contact with the previously positioned first and second bridge boards 351 and 352.

Figure 4:
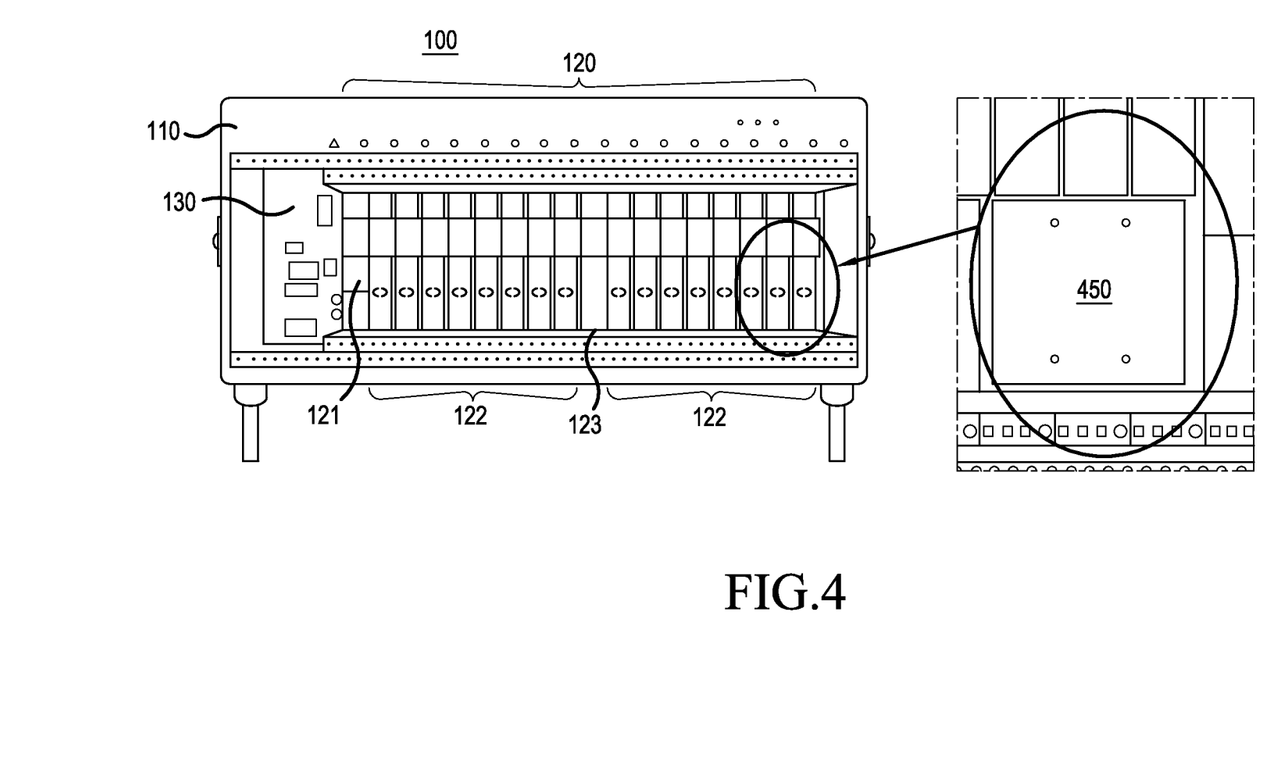
FIG. 4 is a front plan view of the instrumentation chassis showing an example of a bridge board restraint positioned within the instrumentation chassis, to enable placement of bridge boards for high speed connections, according to representative embodiments.

Still alternatively, a bridge board restraint may be attached to portions of the peripheral slots 120 prior to insertion of the first, second and third peripheral modules 310, 320 and 330. FIG. 4 is a front plan view of the instrumentation chassis 100 showing an example of a bridge board restraint positioned within the instrumentation chassis 100, to enable placement of one or more bridge boards for high speed connections, according to a representative embodiment.

Referring to FIG. 4, bridge board restraint 450 is attached to the PXI connectors of the three right-most peripheral slots 122 of the instrumentation chassis 100. The bridge board restraint 450 thus covers the portion of the peripheral slots 122 corresponding to the relative positions of the first and second high speed connectors 318a and 318b of the illustrative first peripheral module 310, first and second high speed connectors 328a and 328b of the second peripheral module 320, and first and second high speed connectors 338a and 338b of the third peripheral module 330, while leaving the corresponding PXIe connectors exposed for use by the first and second PXIe connectors 315a and 315b of the first peripheral module 310, the first and second PXIe connectors 325a and 325b of the second peripheral module 320, and the first and second PXIe connectors 335a and 335b of the third peripheral module 330.

The bridge board restraint 450 provides an attachment mechanism for the first and second bridge boards 351 and 352, and an insulating surface separating the first and second bridge boards 351 and 352 from the peripheral slots 122 and/or the backplane 130. That is, a bridge board restraint is configured to attach a bridge board to the backplane, while keeping the bridge board electrically isolated. In the present example, using the bridge board restraint 450, the first and second bridge boards 351 and 352 may be attached to the respective high speed connectors prior to insertion of the combined first, second and third peripheral modules 310, 320 and 330 into the adjacent peripheral slots 122 in the instrumentation chassis 100, as discussed above. Or, the first and second bridge boards 351 and 352 may be attached to the bridge board restraint 450 prior to insertion of the first, second and third peripheral modules 310, 320 and 330, such that the high speed connections enabled by the bridge boards 351 and 352 are not established until after each of the first, second and third peripheral modules 310, 320 and 330 have been inserted into the adjacent peripheral slots 122, as discussed above.

Generally, the bridge board restraint 450 is a capture mechanism that requires no modifications to the instrumentation chassis 100. The bridge board restraint 450 may be installed in the instrumentation chassis 100 using the legacy PXI connectors of the peripheral slots 120. For example, the bridge board restraint 450 may be plugged into the PXI connectors themselves and a conventional locking mechanism locks the bridge board restraint 450 in place. No modifications to the backplane 130 are required. Further, bridge board restraint(s) 450 are only placed where needed, leaving the rest of the PXI connectors (as well as all of the PXIe connectors) of the peripheral slots 120 and backplane 130 available for use with legacy or pre-existing PXI and/or PXIe modules.

Figure 5A:
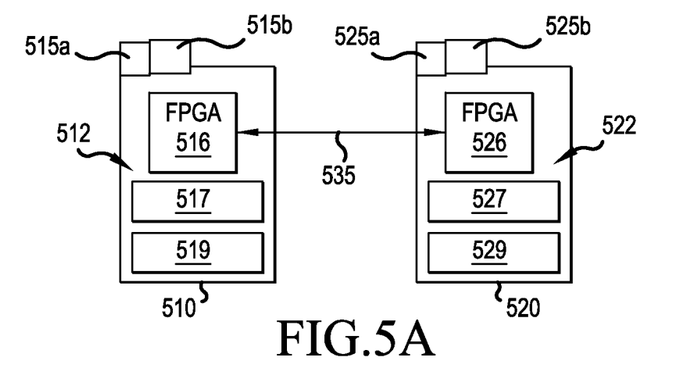
FIGS. 5A, 5B and 5C are simplified block diagrams depicting examples of modules and/or PCAs interconnected by protocol agnostic bridge boards, according to representative embodiments.
Figure 5B:
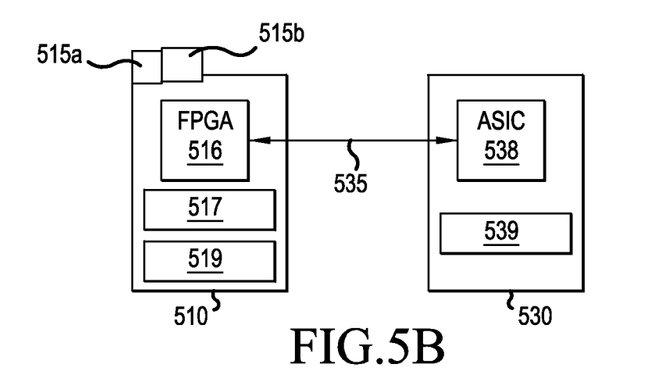
Figure 5C:
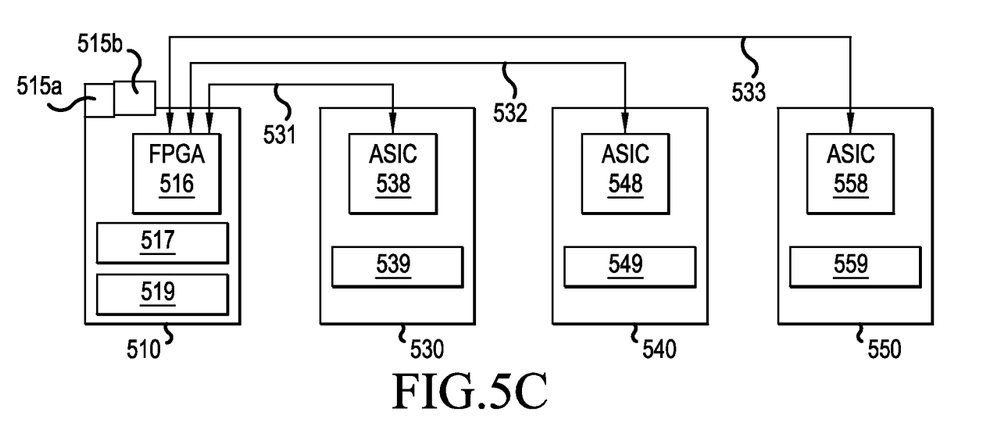

FIGS. 5A, 5B and 5C are simplified block diagrams depicting examples of modules and/or PCAs interconnected by protocol agnostic bridge boards, according to representative embodiments.

Referring to FIG. 5A, peripheral module 510 is connected by protocol agnostic bridge board 535 (board-to-board high speed interconnect) to peripheral module 520. The peripheral module 510 includes first and second PXIe connectors 515a and 515b and the peripheral module 520 includes first and second PXIe connectors 525a and 525b, which may be used to establish connections with PXIe connectors in respective peripheral slots 122 of the instrumentation chassis 100, for example. The peripheral modules 510 and 520 include corresponding PCAs 512 and 522. The PCA 512 includes FPGA 516, electronic circuit 517 and power supply and regulator 519, and the PCA 522 includes FPGA 526, electronic circuit 527 and power supply and regulator 529. As indicated in FIG. 5A, the bridge board 535 establishes a direct connection between the FPGA 516 and the FPGA 526 with a high number of transceiver lanes, e.g., not following the PCIe protocol (or any other specific protocol). The FPGAs 516 and 526 may be typical commercial FPGAs, which provide very high serial rate transceivers. Accordingly, the bridge board 535 may provide differential point-to-point connections between the FPGAs 516 and 526 at data rates up to 28 Gbps for each differential pair, for example. Notably, the bridge board 535 does not follow the PCIe protocol, and therefore has a much higher bandwidth than the eight lanes PCIe (Gen3). For example, the bridge board 535 may have up to 48 lanes.

Referring to FIG. 5B, the peripheral module 510 is connected by protocol agnostic bridge board 535 to PCA 530. Unlike the peripheral module 520 and corresponding PCA 522, the PCA 530 does not include PXIe connectors, and therefore cannot be directly connected to a corresponding peripheral slot 122 (although the PCA 530 will occupy a space within the instrumentation chassis 100 corresponding to one or ore of the peripheral slots 122). The PCA 530 includes ASIC 538 and power supply and regulator 539. As indicated in FIG. 5B, the bridge board 535 establishes a direct connection between the FPGA 516 and the ASIC 538 with a high number of transceiver lanes, not following the PCIe protocol.

Referring to FIG. 5C, the peripheral module 510 is connected to multiple PCAs by separate protocol agnostic bridge boards. In particular, the peripheral module 510 is connected to PCAs 530, 540 and 550 by bridge boards 531, 532 and 533, respectively. None of the PCAs 530, 540 or 550 includes PXIe connectors, and therefore cannot be directly connected to corresponding peripheral slots 122. The PCA 530 includes ASIC 538 and power supply and regulator 539, the PCA 540 includes ASIC 548 and power supply and regulator 554, and the PCA 550 includes ASIC 558 and power supply and regulator 559. As indicated in FIG. 5C, the bridge boards 531, 532 and 533 establish direct connections between the FPGA 516 and the ASICs 538, 548 and 558, respectively, each with a high number of transceiver lanes, e.g., not following the PCIe protocol.

Figure 6A:
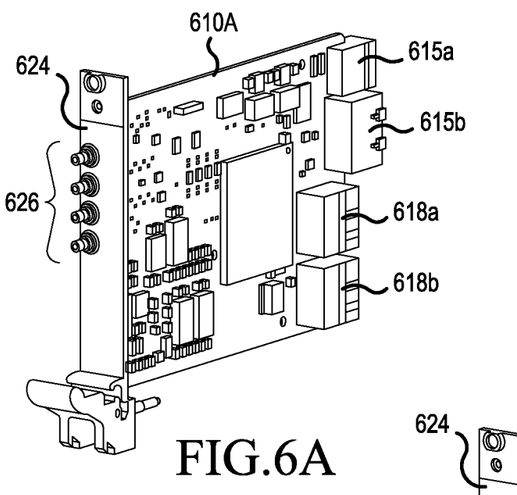
FIGS. 6A, 6B and 6C are perspective views of PXIe modules configured for insertion within peripheral slots of an instrumentation module to connect with the backplane and/or high speed bridge boards, according to representative embodiments.
Figure 6B:
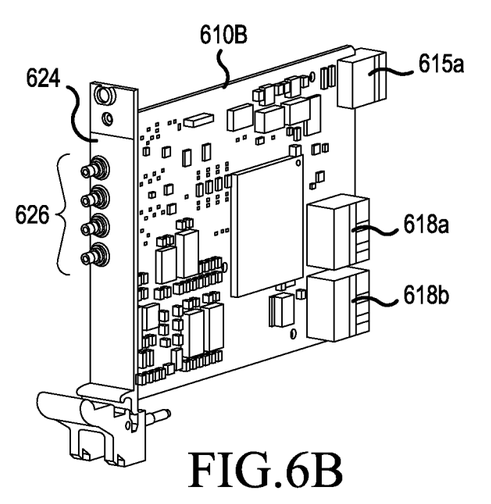
Figure 6C:
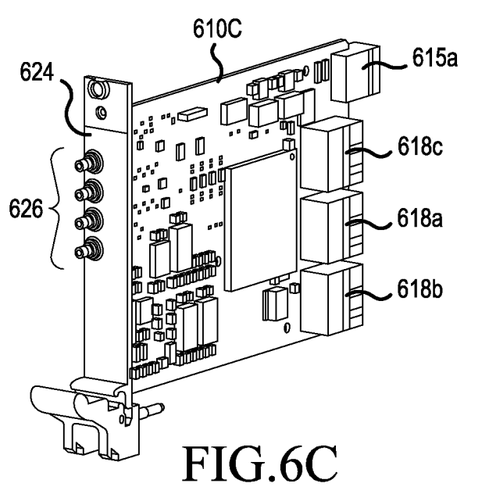

FIGS. 6A, 6B and 6C are perspective views of PXIe modules 610A, 610B and 610C configured for insertion within peripheral slots of an instrumentation module to connect with the backplane and/or high speed bridge boards, according to representative embodiments.

Referring to FIG. 6A, PXIe module 610A includes first and second PXIe connectors 615a and 615b (illustrative standard connectors), and first and second high speed connectors 618a and 618b. The first PXIe connector 615a may be a power connector for powering the PXIe module 610A and the second PXIe connector 615b may be a signal connector enabling PCIe communications via the switch fabric of the backplane (e.g., backplane 130). The first and second high speed connectors 618a and 618b enable connections to one or more bridge boards, such as first and second bridge boards 351 and 352, for example, for high speed communication with other modules and/or PCAs via the corresponding bridge boards. The PXIe module 610A also includes a module front panel 624 with various controls (e.g., power switches, rheostats) (not shown) to enable operational control of the circuitry within the PXIe module 610A, as well as exposed connectors 626 (e.g., coaxial cable connectors) to enable direct connectivity to front panels of other modules within the corresponding instrumentation chassis and/or to external devices. Notably, the configuration of the PXIe module 610A is substantially the same as that of the first, second and third peripheral modules 310, 320 and 330 discussed above with reference to FIG. 3.

Referring to FIGS. 6B and 6C, the respective PXIe modules 610B and 610C are similar to the PXIe module 610A in FIG. 6A, with differing numbers of PXIe and high speed connectors. For example, the PXIe module 610B includes only the first PXIe connector 615a for powering the PXIe module 610A. The PXIe module 610B still includes both high speed connectors, the first and second high speed connectors 618a and 618b, enabling connections with up to two bridge boards for high speed communication with other modules and/or PCAs. Likewise, the PXIe module 610C includes only the first PXIe connector 615a for powering the PXIe module 610C. However, the PXIe module 610C includes an additional high speed connector, thus providing first, second and third high speed connectors 618a, 618b and 618c, enabling an increased number of electrical connections and connections with up to three bridge boards for high speed communication with other modules.

In the PXIe modules 610A, 610B and 610C, the first and second PXIe connectors 615a and 615b extend from upper regions of the rear portions of the PXIe modules 610A, 610B and 610C, as discussed above. This enables the first and second PXIe connectors 615a and 615b to plug into connectors of corresponding peripheral slots 122 and access to the switch fabric of the backplane 130. In contrast, the first, second and third high speed connectors 618a, 618b and 618c are recessed in comparison with the first and second PXIe connectors 615a and 615b. This enables the bridge boards to connect with high speed connectors of other modules without coming into direct contact with the peripheral slots 122 and/or the backplane 130, assuming the first, second and third high speed connectors 618a, 618b and 618c are recessed enough to create a space able to accommodate the thickness of each bridge board.

Figure 7:
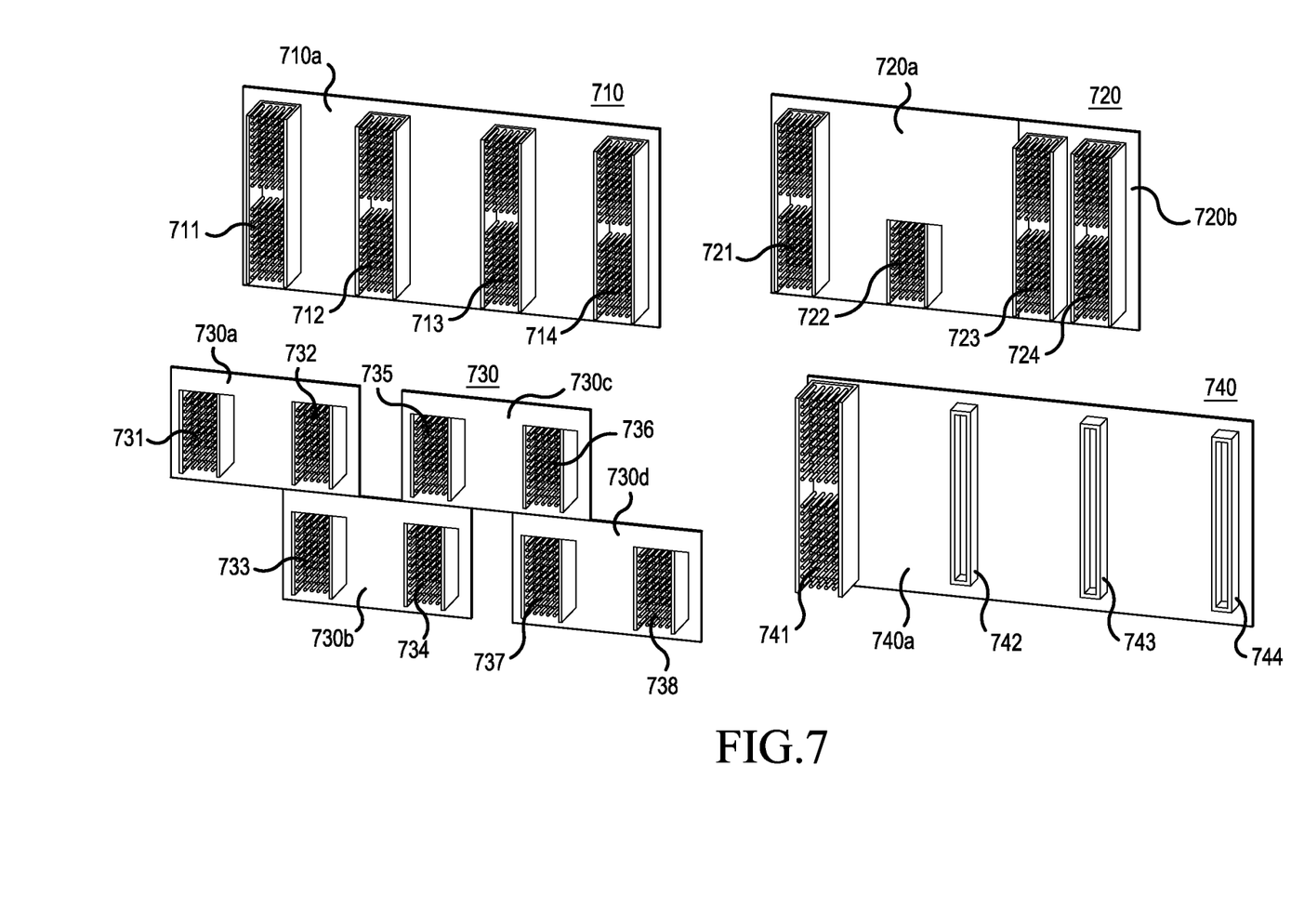
FIG. 7 provides perspective views of illustrative high speed bridge board configurations, according to representative embodiments.

FIG. 7 provides perspective views of illustrative high speed bridge board configurations, according to representative embodiments, each of which provides protocol agnostic high speed connections between modules and/or PCAs.

Referring to FIG. 7, illustrative bridge board configurations 710, 720, 730 and 740 include various connectors to accommodate different system designs to provide direct high speed interconnects where needed. Each of the bridge board configuration 710, 720, 730 and 740 are configured to attach to the PXI connectors of peripheral slots (e.g., in bottom row 120b) of instrumentation chassis 100, as discussed above with reference to FIG. 4, for example. Of course, various bridge board configurations may be attached to different types of connectors within instrumentation chassis, without departing from the scope of the present teachings.

Bridge board configuration 710 includes one bridge board 710a with four full connectors 711, 712, 713 and 714 spaced apart from one another (e.g., by about the width of a peripheral slot 122) in order to receive four modules and/or PCAs that will be connected by the high speed connection. Due to the larger spacing, one or more of the modules and/or PCAs may be wider than the width of a peripheral slot 122, providing greater design flexibility. The bridge board 710a will provide a direct high speed connection among all of the high speed connectors on the modules and/or PCAs.

Bridge board configuration 720 includes bridge board 720a with one full connector 721 and one half connector 722, and bridge board 720b with two full connectors 723 and 724. Connector 721 and connector 722 are spaced apart from one another (e.g., by about the width of a peripheral slot 122), in order to receive two modules and/or PCAs that will be connected by the high speed connection. The half connector 722 enables connection or a narrower bridge board (or possibly a single bridge board, as opposed to multiple adjacent bridge boards) than those accommodated by the full connectors 723 and 724, for example. Due to the larger spacing, one or more of the modules and/or PCAs may be wider than the width of a peripheral slot 122, providing greater design flexibility. Connectors 723 and 724 on the bridge board 720b are spaced immediately adjacent to one another (e.g., about the same distance as adjacent peripheral slots 122). Accordingly, modules and/or PCAs connected to the connectors 723 and 724 will have substantially the same dimensional requirements as the peripheral modules plugged directly into the peripheral slots 122.

Bridge board configuration 730 includes bridge boards 730a, 730b, 730c and 730d. The bridge board 730a has two half connectors 731 and 732 spaced apart from one another (e.g., by about the width of a peripheral slot 122), in order to receive two modules and/or PCAs that will be connected by the high speed connection. The bridge board 730b has two half connectors 733 and 734 spaced apart from one another (e.g., by about the width of a peripheral slot 122), in order to receive two modules and/or PCAs that will be connected by the high speed connection. The bridge board 730c has two half connectors 735 and 736 spaced apart from one another (e.g., by about the width of a peripheral slot 122), in order to receive two modules and/or PCAs that will be connected by the high speed connection. The bridge board 730d has two half connectors 737 and 738 spaced apart from one another (e.g., by about the width of a peripheral slot 122), in order to receive two modules and/or PCAs that will be connected by the high speed connection. Notably, connectors 732 and 733 are stacked to receive the same module and/or PCA; connectors 734 and 735 are stacked to receive the same module and/or PCA; and connectors 736 and 737 are stacked to receive the same module and/or PCA. However, each of the modules and/or PCAs in the stacked connectors (732/733, 734/735, 736/737) has high speed connections to two different modules and/or PCAs through the depicted arrangement of the bridge boards 730a, 730b, 730c and 730d.

Bridge board configuration 740 includes one bridge board 740a with four full connectors, similar to the bridge board configuration 710, except that the bridge board 740a includes a first type of connector 741 and three connectors 742, 743 and 744 of another type. Thus, the bridge board configuration 740 illustrates that different connector types may be used on the same bridge board (e.g., bridge board 740a), interconnecting modules containing different connector types, respectively (as long as the connectors 741, 742, 743 and 744 are on the same mechanical plane).

Figure 8:
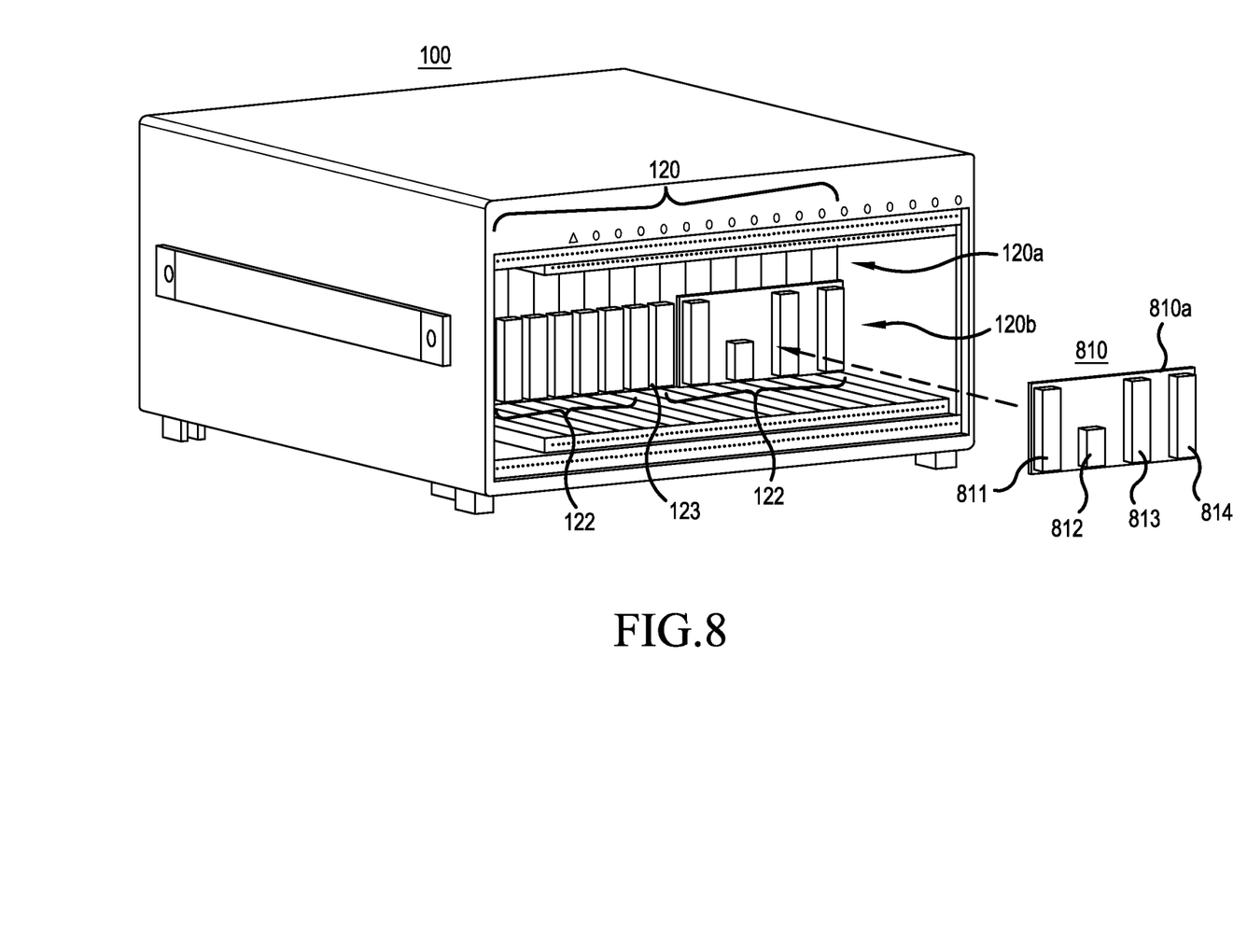
FIG. 8 is a front perspective view of an instrumentation chassis showing an example of a bridge board configuration, according to a representative embodiment.

FIG. 8 is a front perspective view of an instrumentation chassis showing an example of a bridge board configuration, according to a representative embodiment.

Referring to FIG. 8, illustrative bridge board configuration 810 is shown being attached to peripheral slots 122 of the instrumentation chassis 100. The bridge board configuration 810 is configured to attach to the PXI connectors of seven adjacent peripheral slots 122 (e.g., in bottom row 120b) of instrumentation chassis 100, as discussed above with reference to FIG. 4, for example, leaving the PXIe connectors of all of the peripheral slots 122 exposed. In the depicted example, the bridge board configuration 810 includes bridge board 810a with three full connectors 811, 813 and 814 and one half connector 812. The connectors 811, 812, 813 and 814 are spaced apart from one another (e.g., by about the width of a peripheral slot 122) in order to receive four modules and/or PCAs that will be connected by the high speed connection. As mentioned above, due to the larger spacing, one or more of the modules and/or PCAs may be wider than the width of a peripheral slot 122, providing greater design flexibility. Of course, various bridge board configurations, including those depicted in FIG. 7, may be attached in a similar fashion to adjacent peripheral slots 122 within the instrumentation chassis 100, without departing from the scope of the present teachings.

Generally, incorporation of a protocol agnostic bridge board that provides a high speed connection enables high speed PCA to PCA two way transceiver (or one way transmitter/receiver) interconnects between PCAs or modules in a PXIe system. For example, the PCA to PCA interconnects may be high speed differential pair transmission lines that are not protocol specific. The PCA to PCA interconnects are flexible and can be changed depending on the module types and module loading configuration used in the chassis. Further, PCA to PCA interconnects do not utilize front panel space. Multiple PCAs therefore can be interconnected in various configurations. As described above, the various PCAs may be incorporated into peripheral modules configured to plug into peripheral slots of an instrumentation chassis, or otherwise connected to peripheral modules (e.g., via the bridge board(s)).

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed:

1. An instrumentation chassis, comprising:
a backplane;
a plurality of peripheral slots located on the backplane and configured to receive a plurality of insertable peripheral modules, respectively; and
at least one protocol agnostic high speed connection mounted on, but not electrically connected to the backplane and configured to interconnect at least two peripheral modules in corresponding peripheral slots of the plurality of peripheral slots, bypassing the backplane, enabling high speed communications between the at least two peripheral modules.

2. The instrumentation chassis of claim 1, wherein the at least one protocol agnostic high speed connection comprises differential pair high speed connections.

3. The instrumentation chassis of claim 2, wherein the differential pair high speed connections comprise transceiver connections.

4. The instrumentation chassis of claim 3, wherein the insertable peripheral modules comprise processing or converter elements which communicate over the transceiver connections contained on the at least one protocol agnostic high speed connection.

5. The instrumentation chassis of claim 4, wherein the processing or converter elements comprise at least one of a field-programmable gate array (FPGA), an application-specific integrated circuit (ASIC), a JESD204B Analog to Digital Converter or a JESD204B Digital to Analog Converter.

6. The instrumentation chassis of claim 2, wherein the differential pair high speed connections comprise connections enabling communication in one direction only.

7. The instrumentation chassis of claim 2, wherein the differential pair high speed connections comprise Serializer/Deserializer (SerDes) connections.

8. The instrumentation chassis of claim 1, wherein each of the at least two peripheral modules contains a differential pair high speed connector for interconnecting modules with at least one differential pair high speed connection.

9. The instrumentation chassis of claim 1, wherein the instrumentation chassis comprises a peripheral component interconnect express (PCIe) eXtensions for instrumentation (PXIe) chassis, and
wherein at least one of the at least two peripheral modules contains a standard PXIe connector for connecting with the corresponding peripheral slot and a high speed transceiver connection for connecting with the at least one high speed connection.

10. An instrumentation chassis, comprising:
a backplane;
a plurality of peripheral slots located on the backplane and configured to receive a plurality of insertable peripheral modules; and
a bridge board attachable to the backplane, the bridge board comprising a plurality of differential pair high speed connections configured to interconnect insertable peripheral modules, bypassing the backplane, of the plurality of insertable peripheral modules.

11. The instrumentation chassis of claim 10, wherein at least one of the plurality of differential pair high speed connections comprises a high speed transceiver connection, or a connection enabling communication in one direction only.

12. The instrumentation chassis of claim 10, wherein each of the plurality of insertable peripheral modules comprises at least one high speed transceiver connection for connecting with the bridge board.

13. The instrumentation chassis of claim 10, wherein each of the insertable peripheral modules further comprises at least one standard connector for connecting with the backplane via a respective peripheral slot.

14. The instrumentation chassis of claim 10, further comprising:
a bridge board restraint configured to attach the bridge board to the backplane, while keeping the bridge board electrically isolated.

15. The instrumentation chassis of claim 14, wherein the bridge board restraint is installed in the instrumentation chassis using legacy connectors of the peripheral slots.

16. An instrumentation chassis, comprising:
a backplane;
a plurality of peripheral slots located on the backplane and configured to receive a plurality of insertable peripheral modules; and
a bridge board attachable to the backplane, the bridge board containing a plurality of mixed signal connections configured to interconnect insertable peripheral modules, by-passing the backplane, of the plurality of insertable peripheral modules.

17. The instrumentation chassis of claim 16, wherein at least one of the mixed signal connections comprises radio frequency (RF) or microwave connectors.

18. The instrumentation chassis of claim 17, wherein at least one of the mixed signal connections comprises coaxial blindmate connectors with attached transmission lines between connectors configured to interconnect insertable peripheral modules.

19. The instrumentation chassis of claim 17, wherein the insertable peripheral modules comprise processing or converter elements which communicate over the plurality of mixed signal connections.

* * * * *